US012312443B2

(12) United States Patent
Conradi et al.

(10) Patent No.: US 12,312,443 B2
(45) Date of Patent: May 27, 2025

(54) POLYMERIC ANION-CONDUCTING MEMBRANE

(71) Applicant: Evonik Operations GmbH, Essen (DE)

(72) Inventors: Oliver Conradi, Düsseldorf (DE); Artjom Maljusch, Bochum (DE); Harald Rögl, Wallern an der Trattnach (AT); Gianluigi Luppi, Düsseldorf (DE)

(73) Assignee: Evonik Operations GmbH, Essen (DE)

( * ) Notice: Subject to any disclaimer, the term of this patent is extended or adjusted under 35 U.S.C. 154(b) by 668 days.

(21) Appl. No.: 17/629,285

(22) PCT Filed: Jul. 16, 2020

(86) PCT No.: PCT/EP2020/070153
§ 371 (c)(1),
(2) Date: Jan. 21, 2022

(87) PCT Pub. No.: WO2021/013694
PCT Pub. Date: Jan. 28, 2021

(65) Prior Publication Data
US 2022/0243012 A1   Aug. 4, 2022

(30) Foreign Application Priority Data

Jul. 22, 2019 (EP) .................. 19187560

(51) Int. Cl.
| | |
|---|---|
| C08G 65/40 | (2006.01) |
| C08J 5/22 | (2006.01) |
| C25B 13/08 | (2006.01) |
| H01M 8/1025 | (2016.01) |
| H01M 8/1072 | (2016.01) |

(52) U.S. Cl.
CPC ........ *C08G 65/4031* (2013.01); *C08J 5/2256* (2013.01); *C25B 13/08* (2013.01); *H01M 8/1025* (2013.01); *H01M 8/1072* (2013.01); *C08J 2371/10* (2013.01); *H01M 2300/0082* (2013.01)

(58) Field of Classification Search
USPC ............................................. 521/27; 528/125
See application file for complete search history.

(56) References Cited

U.S. PATENT DOCUMENTS

| | | |
|---|---|---|
| 4,475,985 A | 10/1984 | Kleinloh et al. |
| 6,066,410 A | 5/2000 | Auer et al. |
| 6,071,401 A | 6/2000 | Engel et al. |
| 6,217,728 B1 | 4/2001 | Lehmann et al. |
| 6,299,778 B1 | 10/2001 | Penth et al. |
| 6,620,320 B1 | 9/2003 | Hying et al. |
| 10,006,130 B2 | 6/2018 | Hoch et al. |
| 10,844,145 B2 | 11/2020 | Meier et al. |
| 2004/0038105 A1 | 2/2004 | Hennige et al. |
| 2004/0121210 A1 | 6/2004 | Hamrock et al. |
| 2005/0087491 A1 | 4/2005 | Hennige et al. |
| 2009/0325030 A1 | 12/2009 | Hamrock et al. |
| 2014/0014519 A1 | 1/2014 | Ohmura et al. |
| 2017/0326540 A1 | 11/2017 | Meier-Haack |
| 2020/0262959 A1 | 8/2020 | Conradi et al. |

FOREIGN PATENT DOCUMENTS

| | | |
|---|---|---|
| CN | 104829813 A | 8/2015 |
| CN | 104829814 A | 8/2015 |
| CN | 104829814 B | 4/2017 |
| CN | 106750303 A | 5/2017 |
| CN | 110294845 A | 10/2019 |
| EP | 2296210 A1 | 3/2011 |
| EP | 2424018 A1 | 2/2012 |
| EP | 2606954 A1 | 6/2013 |
| EP | 2224523 B1 | 7/2014 |
| EP | 21208566.6 | 11/2021 |
| WO | 2002047801 A1 | 6/2002 |
| WO | 2002080296 A2 | 10/2002 |
| WO | 2002080297 A2 | 10/2002 |
| WO | 2002092500 A1 | 11/2002 |
| WO | 2002089950 A2 | 8/2003 |
| WO | 2003069708 A2 | 8/2003 |
| WO | 2005045978 A2 | 5/2005 |
| WO | 2005049696 A1 | 6/2005 |
| WO | 2016142382 A1 | 9/2016 |
| WO | 2017172824 A1 | 10/2017 |
| WO | 2018065339 A1 | 4/2018 |
| WO | 2018068788 A1 | 4/2018 |
| WO | 2020262959 A1 | 12/2020 |
| WO | PCT/EP2022/050298 | 1/2022 |

OTHER PUBLICATIONS

Machine-generated English language translation of Description of CN 104829814B, 12 pages, retrieved from ESPACENET on Sep. 16, 2024. (Year: 2015).*
Machine-generated English language translation of Description of CN 106750303A, 9 pages, retrieved from ESPACENET on Sep. 16, 2024. (Year: 2017).*
African Patent Office Action for Application No. AP/P/2021/013620 dated Apr. 5, 2023 (4 pages).
Pham, T.H. et al. "Poly (arylene alkylene) s with pendant N-spirocyclic quaternary ammonium cations for anion exchange membranes." Journal of Materials Chemistry A 6.34 (2018): 16537-16547.
Pham, T.H. et al. "Effects of the N-alicyclic cation and backbone structures on the performance of poly (terphenyl)-based hydroxide exchange membranes." Journal of Materials Chemistry A 7.26 (2019): 15895-15906.
International Search Report PCT/EP2020/070153, dated Aug. 5, 2020, 4 pgs.

(Continued)

*Primary Examiner* — Fred M Teskin
(74) *Attorney, Agent, or Firm* — Michael Best & Friedrich LLP

(57) ABSTRACT

The present invention provides compounds, especially polymeric compounds, having preferably at least one spiro or piperidine structural unit, a process for preparation thereof and the use thereof as anion conducting membrane.

15 Claims, No Drawings

(56) References Cited

OTHER PUBLICATIONS

Written Opinion PCT/EP2020/070153, dated Aug. 5, 2020, 5 pgs.
European Search Report 19187560.8, dated Dec. 4, 2019, 9pgs.
Li Su et al, "Anion conductive piperidinium based poly (ether sulfone): Synthesis, properties and cell performance," Journal of Membrane Science, Elsevier BV, NL, vol. 594, Sep. 13, 2019, 9 pgs.
Wang Fen et al, "Synthesis and property of novel anion exchange membrane based on poly(aryl ether sulfone)s pearning piperidinium moieties," Journal of Membrane Science, Elsevier BV, NL, vol. 591, Aug. 1, 2019, 8 pgs.
U.S. Pat. No. 435,551, Oct. 21, 1982, U.S. Pat. No. 4,475,985, Oct. 9, 1984.
U.S. Appl. No. 08/838,688, filed Apr. 9, 1997, U.S. Pat. No. 6,071,401, Jun. 6, 2000.
U.S. Appl. No. 09/213,357, filed Dec. 17, 1998, U.S. Pat. No. 6,066,410, May 23, 2000.
U.S. Appl. No. 09/404,536, filed Sep. 24, 1999, U.S. Pat. No. 6,217,728, Apr. 17, 2001.
U.S. Appl. No. 09/308,221, filed May 19, 1999, U.S. Pat. No. 6,299,778, Oct. 9, 2001.
U.S. Appl. No. 09/340,408, filed Jun. 28, 1999.
U.S. Appl. No. 09/463,414, filed Mar. 20, 1999, U.S. Pat. No. 6,620,320, Sep. 16, 2003.
U.S. Appl. No. 09/580,096, filed May 30, 2000.
U.S. Appl. No. 10/433,488, filed Oct. 29, 2001, US 20040038105, Feb. 26, 2004.
U.S. Appl. No. 10/498,501, filed Jan. 15, 2003, US 20050087491, Apr. 28, 2005.
U.S. Appl. No. 14/389,564, filed Mar. 15, 2013, U.S. Pat. No. 10,006,130, Jun. 26, 2018.
U.S. Appl. No. 16/301,810, filed May 22, 2017, U.S. Pat. No. 10,844,145, Nov. 24, 2020.
U.S. Appl. No. 16/651,467, filed Oct. 16, 2018, US 20200262959, Aug. 20, 2020.

\* cited by examiner

POLYMERIC ANION-CONDUCTING MEMBRANE

CROSS-REFERENCE TO RELATED APPLICATION

This patent application is the U.S. national stage entry, under 35 U.S.C. § 371, of International Application Number PCT/EP2020/070153, filed Jul. 16, 2020, which application claims priority to European Application No. 19187560.8, filed Jul. 22, 2019, the entire contents of each of which are hereby incorporated by reference.

FIELD

The present invention provides compounds, especially polymeric compounds, having some kind of spiro or piperidine structural unit, a process for preparation thereof and for the use thereof, especially as anion-conducting membranes.

BACKGROUND

Polymeric ion-conducting membranes have long been known. The membranes described in WO 2005/045978 A2, US 2009325030 A1 and US 20040121210 A1 are based on a highly fluorinated polymer backbone.

In EP 2224523 B1 and US 20140014519 A1, anion-conducting membranes are produced, in which a porous film is impregnated with a mixture of various monomers having vinyl groups, at least one of which has a halogen group (chlorine group), the surfaces of the porous film are each covered with a polyester film and then a thermal polymerization is conducted. The material thus obtained is then treated with trimethylamine or methyl iodide and then with NaOH. In EP 2296210 A1, the treatment with trimethylamine is followed by a treatment with $Na_2CO_3$.

In EP 2606954 A1, anion-conducting membranes are obtained by the curing of a polymer solution containing polymers that have been obtained by chloromethylation of polysulfones and subsequent treatment with trimethylamine.

CN 104829814 B discloses a polymer containing a quaternized piperidine group, a preparation method thereof, an anion exchange membrane, and a preparation method thereof. The main chain of the polymer is mainly composed of benzene rings, and the prepared anion exchange membrane has a good mechanical property. The quaternized piperidine group (cation group) in the side chain has a strong alkali resistant performance. The synthesis method of the polymer is simple, the content of the ion groups is controllable, and the polymer can be used to produce anion exchange membranes having the advantages of good mechanical property, high conductivity, and strong alkali resistant performance.

WO 2017172824 A1 discloses poly(aryl piperidinium) polymers which have an alkaline-stable cation, piperidinium, introduced into a rigid aromatic polymer backbone free of ether bonds. Hydroxide exchange membranes or hydroxide exchange ionomers formed from these polymers exhibit superior chemical stability, hydroxide conductivity, decreased water uptake, good solubility in selected solvents, and improved mechanical properties in an ambient dry state as compared to conventional hydroxide exchange membranes or ionomers. Hydroxide exchange membrane fuel cells comprising the poly(aryl piperidinium) polymers exhibit enhanced performance and durability at relatively high temperatures.

T. H. Pham, J. S. Olsson and P. Jannasch developed poly(arylene alkylene)s with pendant N-spirocyclic quaternary ammonium cations for anion exchange membranes and hydroxide ion conducting poly(terphenyl alkylene)s functionalized with piperidine-based quaternary ammonium cations and there synthesis (T. H. Pham, J. S. Olsson, P. Jannasch, J. Mater. Chem. A, 2018, 6, 16537-16547 and T. H. Pham, J. S. Olsson, P. Jannasch, J. Mater. Chem. A, 2019, 7, 15895-15906).

SUMMARY

The problem addressed by the present invention was that of providing alternative compounds suitable as or for production of anion-conducting polymers.

Surprisingly the inventors found that this problem can be solved by the compounds according to the present invention as described hereinafter and in the claims.

The present invention therefore provides compounds as claimed in the claims and described hereinafter.

The present invention likewise provides a process for preparing such compounds and for the use thereof as anion-conducting membranes, and also these membranes themselves.

The polymers according to the invention have the advantage that they can be prepared in a simple manner.

The membranes produced therefrom have the advantage that they have very high mechanical stability and low swelling characteristics combined with high dimensional stability. In addition, the membranes exhibit quite high anion conductivities.

The compounds, processes and uses according to the invention are described by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Percentages specified herein below are by weight unless otherwise stated. Where average values are reported hereinafter, these are the numerical average, unless stated otherwise. Where properties of a material are referred to hereinafter, for example viscosities or the like, these are the properties of the material at 25° C., unless stated otherwise. Where chemical (empirical) formulae are used in the present invention, the specified indices may be not only absolute numbers but also average values.

DETAILED DESCRIPTION

The present invention provides compounds, containing at least one unit of the formula (I)

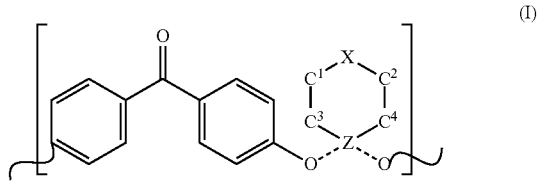

with X being a structure element comprising a nitrogen atom with a positive charge bonded to $C^1$ and $C^2$ and bonded via two bonds to one or two hydrocarbon radical(s) comprising 1 to 12, preferably 1 to 6, more preferably 1 or 5 carbon atoms and Z being a structure element comprising a carbon atom being bonded to $C^3$ and $C^4$ and at least one aromatic 6-ring directly bonded to one of the oxygen atoms, wherein the aromatic rings might be substituted with one or more halogen and/or one or more $C_1$- to $C_4$-alkyl radicals.

Preferably the compound of the present invention is represented by formula (Ia) or (Ib)

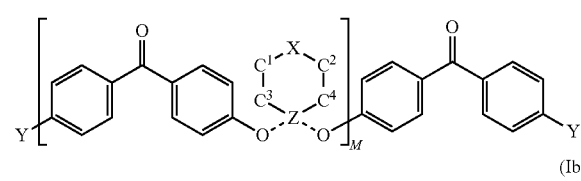
(Ia)

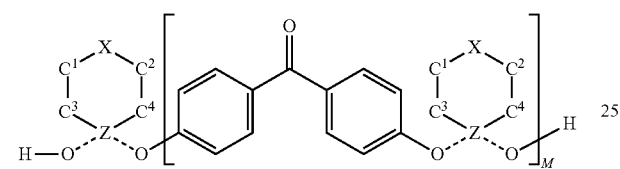
(Ib)

with Y=same or different halogen, preferably F, M being an integer from 1 to 500, preferably 5 to 250, X being a structure element comprising a nitrogen atom with a positive charge bonded to $C^1$ and $C^2$ and bonded via two bonds to one or two hydrocarbon radical(s) comprising 1 to 12, preferably 1 to 6, more preferably 1 or 5 carbon atoms and Z being a structure element comprising a carbon atom being bonded to $C^3$ and $C^4$ and at least one aromatic 6-ring directly bonded to one of the oxygen atoms, wherein the aromatic rings might be substituted with one or more halogen and/or one or more to $C_1$- to $C_4$-alkyl radicals.

The structure element X preferably represents a unit of formula (IIa) or (IIb)

(IIa)

(IIb)

Most preferably the structure element X present in the compound of the present invention represents in more than 50%, preferably in more than 75%, and most preferred in more than 90% of its occurrence a unit of formula (IIa) or (IIb). The occurrence can be determined for example by $^1$H-NMR and/or $^{13}$C-NMR.

The structure element Z preferably represents a unit of formula (IIIa)

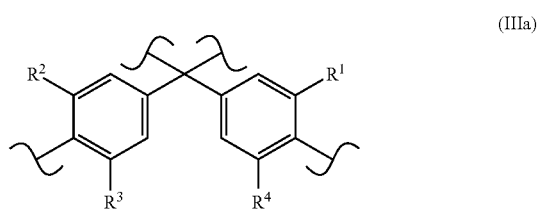
(IIIa)

with $R_1$, $R_2$, $R_3$, and $R_4$ being the same or different —H or an alkyl group having from 1 to 4 carbon atoms, $R_1$, $R_2$, $R_3$ and $R_4$ each preferably being a methyl or tert-butyl group, more preferably being a methyl group.

The compound of the present invention is preferably represented by at least one of formulas (IVa) to (IVd),

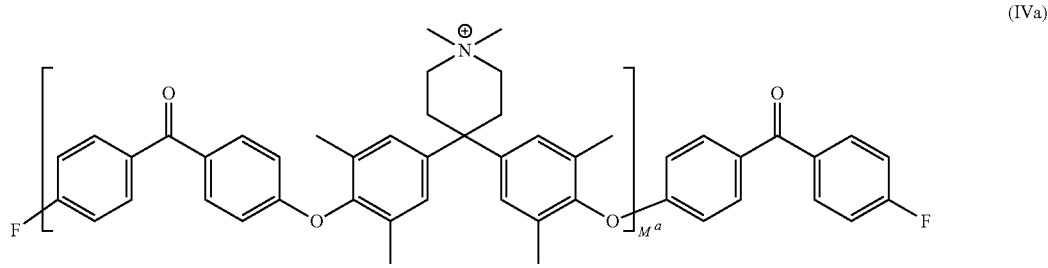
(IVa)

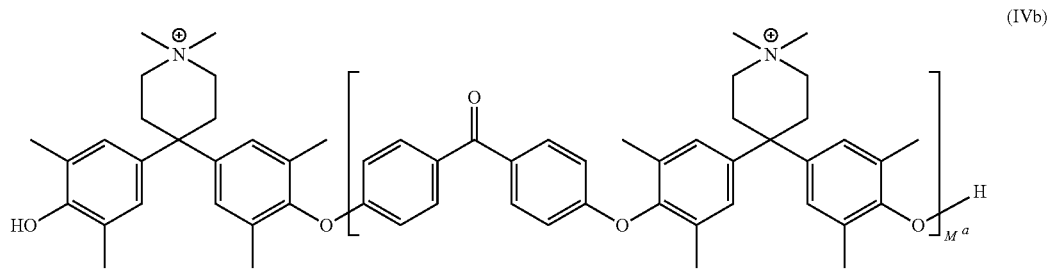
(IVb)

-continued

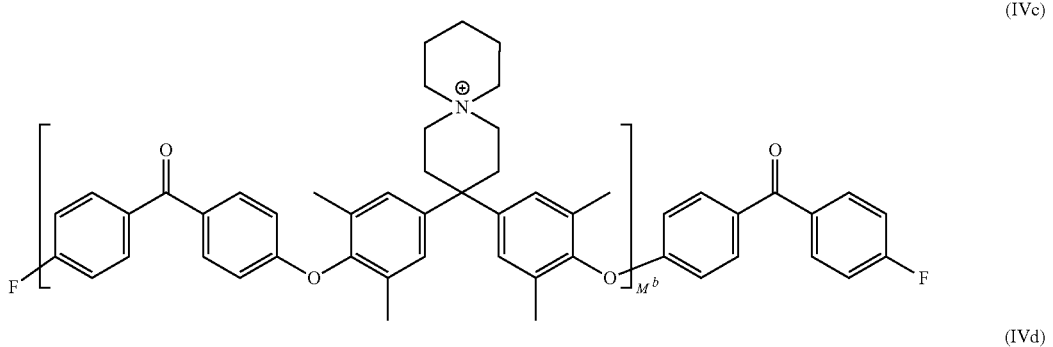

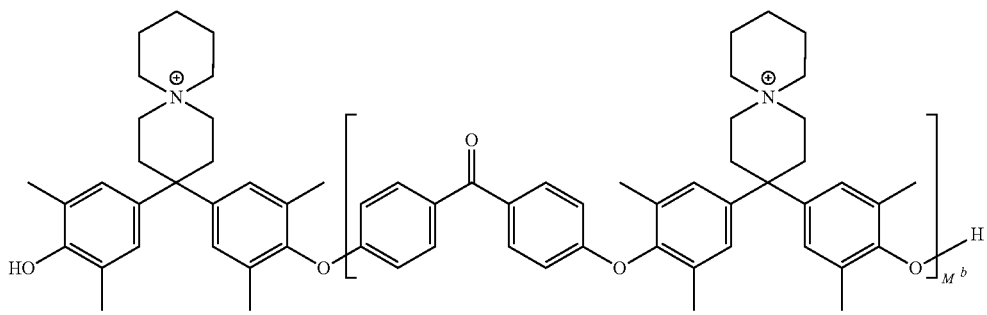

with $M^a$ and $M^b$ being an integer of from 1 to 500, preferably of from 5 to 250, and wherein the aromatic rings might further be substituted with one or more halogen and/or one or more $C_1$- to $C_4$-alkyl radicals.

Most preferred compounds of the present invention are those, where the aromatic rings in the compounds of formula (I), (Ia), (Ib), (IVa), (IVb), (IVc), and (IVd) are not further substituted with one or more halogen or one or more $C_1$- to $C_4$-alkyl radicals.

The compounds according to the invention can be obtained, for example, by the process according to the invention described hereinafter.

The process of the present invention is characterized in that it comprises a step in which a compound of the formula (V)

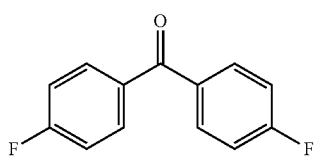

is reacted with a compound selected from formulas (VIa) or (VIb)

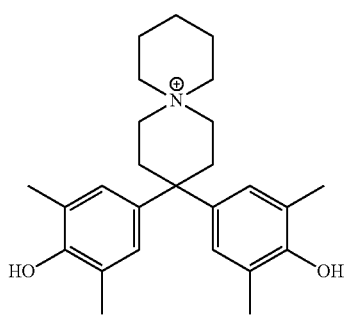

-continued

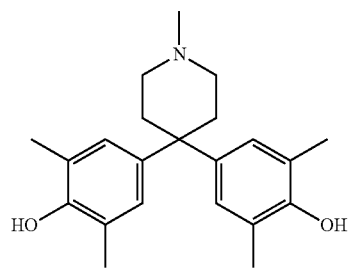

wherein the aromatic rings might further be substituted with one or more halogen and/or one or more $C_1$- to $C_4$-alkyl radicals. Preferably, this reaction step is carried out at a temperature of from 100 to 300° C., more preferably at a reaction temperature of from 125 to 175° C. Most preferably the reaction step is carried out at a temperature where the reaction mixture is boiling, preferably while stirring. The reaction step is most preferably carried out under an inert gas atmosphere, preferably a nitrogen atmosphere. At the top of the reaction vessel, any methanol and/or water formed is preferably removed. The reaction step is preferably carried out in the presence of $K_2CO_3$.

The reaction step is preferably carried out in the presence of an organic solvent. Preferably dimethylacetamide is used as a solvent.

Preferably the process according to the invention comprises a step where an alkylating reagent, preferably a methylating reagent, is used. The preferred methylating agent used is iodomethane. In a preferred process of the invention the aromatic rings in the compounds of formula (V), (VIa), and (VIb) are not further substituted with one or more halogen or one or more $C_1$- to $C_4$-alkyl radicals.

The compounds of the present invention might be used for different purposes. Preferably the compounds of the present invention are polymers and are used as anion-conducting membranes or for the production of anion-conducting membranes.

Preferably the compounds of the present invention are used for the production of a component, which is used in an electrochemical process, preferably selected from electrolysis, electrodialysis and fuel cell technology.

Another aspect of the present invention are processes for the production of anion-conducting membranes and for the production of components, which can be used in an electrochemical process, preferably selected from electrolysis, electrodialysis and fuel cell technology, characterized in that a compound according to the present invention is applied.

Another aspect of the present invention is therefore an electrolyzer, characterized in that it includes a compound according to the present invention as described above.

The examples below describe the present invention by way of example, without any intention that the invention, the scope of application of which is apparent from the entirety of the description and the claims, be restricted to the embodiments specified in the examples.

EXAMPLES

Example 1: Synthesis of Piperidine Containing Monomer (VIb)

One 500 ml three-necked flask with internal thermometer, heating with magnetic stirrer and reflux cooler was fed with 150 g of acetic acid, 17 g (0.15 mol) of N-Methylpiperidone, 49 g (0.40 mol) of 2,6-Dimethylphenol and 30 g of concentrated hydrochloric acid. Subsequently, this solution was heated under stirring to 90° C. Over the reaction time a significant part of the product precipitated. After 40 hours, the reaction mass was cooled to room temperature. The crystallized precipitate was filtered off, washed three times with a small amount of acetic acid and suspended in a mixture of 250 g of water with 400 g of ethanol. Subsequently, the suspension was heated to 80° C. leading to dissolution of suspended solid. By adding ammonia solution N-Methyl-4,4-Bis (3',5'-Dimethyl, 4'-Hydroxyphenyl)-Piperidine monomer was precipitated. After cooling to room temperature this was filtered off, the filter cake was 3 times washed with water and dried overnight in vacuum.

Example 2: Synthesis of Piperidine Containing Polymer

Synthesis was performed in a 500 mL three-necked flask with oil bath, mechanical stirrer, a packed column with distillation head cooler with adjustable return ratio and condensate removal. At the beginning of synthesis 0.09 mol (30.51 g) of N-Methyl-4,4-Bis (3',5'-Dimethyl, 4'-Hydroxyphenyl)-Piperidine, 0.09 mol (19.62 g) of 4,4'-Difluorobenzophenone, 105 g of dimethylacetamide and 0.135 mol of finely ground $K_2CO_3$ were mixed under nitrogen atmosphere over 1 hour at room temperature. Afterwards the temperature of the oil bath was increased to 235° C. leading to boiling of the reaction mixture. Generated water was removed using the column and 55 g of dimethylacetamide were added to the reaction mixture. After 4 hours additional 50 g dimethylacetamide were added to the reaction mixture and the temperature of the oil bath was decreased to 190° C. After 10 hours the heating of the oil bath was turned off and the reaction product was cooled down to room temperature and poured into water. The product was washed with hot water two times and one time with an ethanol:water=1:1 mixture (by volume). Finely, it was dried under vacuum at 125° C. overnight. The yield was almost stoichiometric at 45 g.

Example 3: Quaternization of Piperidine Containing Polymer from Example 2

10 g of the polymer from Example 2 were dissolved in 45 g of dimethylacetamide under stirring at 50° C. for 1 hour. After cooling of the polymer solution down to 30° C. 4.13 g of iodomethane were slowly added dropwise to the polymer solution and it was stirred for additional 2 hours. Excess of iodomethane was removed after quaternization of the polymer by use of a vacuum pump at 200 mbar and the gas phase was passed through two serially arranged gas washing bottles filled with an aqueous 30 wt.-% solution of KOH.

Example 4: Membrane Casting of Piperidine Containing Polymer from Example 3

The solution of the quaternized polymer from Example 3 was directly used for preparation of the membrane. The required amount of polymer solution was taken up with a syringe and applied directly through a 0.45 μm PTFE filter on a glass plate preheated to 40° C. For the coating of the glass plate, an applicator with doctor blade was automatically pulled over the glass plate at a speed of 5 mm/s. The applied wet layer was pre-dried for 12 hours under nitrogen atmosphere at room temperature and then dried for 6 hours at 60° C. under vacuum.

Example 5: Synthesis of Spiro Containing Monomer (VIa)

In a 2 L three-necked flask with magnetic stirrer, temperature control and condenser 36 g (0.26 mol) of $K_2CO_3$ were dissolved in 150 ml of EtOH. Then 57.3 g (0.40 mol) of 1,4-Dioxa-8-azaspiro[4,5]decane were dissolved in 800 ml of EtOH and transferred in three-necked flask. After that temperature was regulated to 35° C. Subsequently, a solution of 92 g (0.40 mol) of 1,5-Dibrompentane in 150 ml of EtOH was added dropwise over 12 hours. After 70 hours reaction products were cooled to room temperature, precipitated KBr was separated by filtration and the solution was concentrated on a rotary evaporator. During concentration process additional amount of KBr crystallizes and was filtered off. The filtrate solidified at temperature below 80° C., was filtered and used without further purification as one of educts for synthesis of spiro containing monomer (VIa).

In a 500 ml round bottom flask with magnetic stirrer and oil bath 51.5 g (0.177 mol) of the molecule described above and 0.44 mol of 2,6-Dimethylphenol and 20 g (0.21 mol) of methanesulfonic acid, 1 g of water and 0.90 g (0.005 mol) of Sodium 3-mercapto-1-propanesulfonate were stirred for 70 hours at 100° C. The mixture was cooled to room temperature and mixed three times with 200 g of water. After that it was distilled at 10 mbar pressure to remove volatile substances. Spiro containing monomer (VIa) partially solidified and was two times recrystallized in 25 vol % mixture of EtOH in water.

Example 6: Synthesis of Spiro Containing Polymer

Synthesis was performed in a 100 mL three-necked flask with oil bath, mechanical stirrer, a packed column with distillation head cooler with adjustable return ratio and condensate removal. At the beginning of synthesis 0.01 mol (4.89 g) of 3,3-bis(4-hydroxy-3,5-dimethylphenyl)-6-azaspiro [5.5]undecane-6-ium methane sulfonate, 0.01 mol (2.18 g) of 4,4'-Difluorobenzophenone, 15 g of dimethylacetamide and 0.0125 mol (1.73 g) of finely ground $K_2CO_3$ were mixed under nitrogen atmosphere over 1 hour at room temperature. After that, the temperature of the oil bath was increased to 235° C. leading to boiling of the reaction mixture. Generated water was removed using the column and 8 g of dimethylacetamide were added to the reaction mixture. After 10 hours heating the oil bath was turned off and reaction product was cooled down to room temperature and poured in ethyl acetate. The product was washed with hot water three times and one time with an ethanol:water=1:1 (by volume) mixture. Finely, it was dried under vacuum at 110° C. overnight.

Example 7: Membrane Casting of Spiro Containing Polymer from Example 6

10 g of polymer from Example 6 were dissolved in 30 g of dimethylacetamide under stirring at 50° C. for 1 hour. The required amount of polymer solution was taken up with a syringe and applied directly through a 0.45 µm PTFE filter on a glass plate preheated to 40° C. For the coating of the glass plate, an applicator with doctor blade was automatically pulled over the glass plate at a speed of 5 mm/s. The applied wet layer was pre-dried for 12 hours under nitrogen at room temperature and then dried for 6 hours at 60° C. under vacuum.

Example 8: Synthesis of Spiro Containing Block-co-Polymer

Step 1: In a 100 ml three-necked flask with magnetic stirrer, heating and reflux condenser, 0.02 mol (6.72 g) 4,4'-(Hexafluoroisopropylidene)diphenol, 0.018 mol (3.924 g) 4,4'-Difluorobenzophenone were dissolved in 24 g dimethylformamide. After adding 0.0225 mol (3.1 g) milled $K_2CO_3$, all educts were refluxed for 4 hours and then cooled to room temperature under nitrogen atmosphere.

Step 2: In a 250 ml three-necked flask with mechanical stirrer, heating, column with distillate removal head 0.02 mol (9.78 g) of spiro containing monomer (VIa) from Example 5, 0.022 mol (4.796 g) 4,4'-Difluorobenzophenone, 0.0225 mol (3.1 g) milled $K_2CO_3$ were mixed in 35 g dimethylformamide and slowly heated to boiling. As a result, a sparingly soluble precipitate was formed and was resolved completely in the course of reaction. Water formed during the reaction was removed at the column head. Mixture of educts was refluxed for 15 hours and then cooled to room temperature under nitrogen.

Step 3: The reaction mass of Step 1 was slowly added into the reaction mass of Step 2 and 25 g dimethylformamide were added to this mixture. The apparatus was purged with nitrogen and boiled for 6 hours at reflux and while stirring. The solution was cooled to room temperature under nitrogen atmosphere.

Example 9: Membrane Casting of Spiro Containing Block-co-Polymer from Example 8

10 g of polymer from Example 8 were dissolved in 30 g of dimethylacetamide under stirring at 50° C. for 1 hour. The required amount of polymer solution was taken up with a syringe and applied directly through a 0.45 µm PTFE filter on a glass plate preheated to 40° C. For the coating of the glass plate, an applicator with doctor blade was automatically pulled over the glass plate at a speed of 5 mm/s.

The applied wet layer was pre-dried for 12 hours under nitrogen at room temperature and then dried for 6 hours at 60° C. under vacuum.

Example 10: Ion Exchange of Membranes

The membranes prepared in Examples 4, 7, and 9 respectively were ion-exchanged: Samples of the membranes were placed in aqueous 1 M KOH solution for 24 hours at 60° C. Afterwards the membrane samples were rinsed off with deionized water and placed in fresh portions of the deionized water 3 times for 1 hour each at 60° C. Subsequently, the membrane samples were stored in a fresh portion of the deionized water overnight at room temperature.

Example 11: Measurement of Ionic Conductivity (IC)

The in-plane ionic conductivity of ion-exchanged membrane samples from Example 10 were measured by means of impedance spectroscopy (EIS) in a conventional 4-electrode arrangement. The membrane sample was mounted in a commercial BT-112 cell (Bekk Tech LLC), so that the two outer Pt wires were placed under the sample and the two midpoint Pt wires above the sample. The BT-112 cell was mounted between 2 PTFE plates and filled with deionized water. The temperature of the deionized water was controlled by a water bath and deionized water was pumped permanently through the cell. The calculation of the membrane resistance ($R_{membrane}$) was carried out by fitting acquired EIS spectrum using a widely used R (RC) Randles equivalent circuit. The ionic conductivity (σ) of the membrane sample is given by equation (1):

$$\sigma = L/(R_{membran}*A) \quad (1)$$

where L is the distance between Pt wires (5 mm) and A is the area of the membrane sample between the two outer Pt wires. Each measurement was repeated for 3 samples per membrane and a mean±standard deviation was calculated.

Two commercially available ion exchange membranes were tested in the same way. The results of the measurements are given in Table 1.

Example 12: Measurement of Water Uptake (VW)

Ion-exchanged membrane samples from Example 10 (3 samples per membrane tested) were used for measurement of water uptake. All samples were dried for 24 hours in a vacuum oven at 40° C. and 25 mbar, then cooled in a desiccator to room temperature and weighted. For the measurement of the water uptake, membrane samples were stored for 24 hours in deionized water at 25° C. Subsequently, the weight of each sample was determined again. For this purpose, adhering water was removed from the membrane with the aid of a filter paper. Each measurement was repeated 3 times and a mean±standard deviation was calculated. The water uptake (WU) results from equation (2):

$$WU = (m_{wet} - m_{dry})/m_y * 100\% \quad (2)$$

with $m_{wet}$ the mass of the sample after swelling and $m_{dry}$ the mass of the sample after drying.

Two commercially available ion exchange membranes were tested in the same way. The results of the measurements are given in Table 1.

Example 13: Measurement of Dimensional Stability (DS)

Ion-exchanged membrane samples from Example 10 (3 samples per membrane tested) were used for the measurement of dimensional stability. All samples were dried for 24 hours in a vacuum oven at 40° C. and 25 mbar, then cooled in a desiccator to room temperature. Such parameters as the sample length, the sample width and the sample thickness were determined. To determine the swelling behavior, membrane samples were stored for 24 hours in deionized water at 25° C. Subsequently, the sample length, the sample width and the sample thickness were determined again. For this purpose, adhering water was removed from the membrane with the aid of a filter paper. Each measurement was repeated 3 times and a mean±standard deviation was calculated. The swelling behavior (referred to as dimensional stability, DS) in length, width and thickness is given by Equation (3):

$$DS=(x_{wet}-x_{dry})/x_{dry}*100\% \tag{3}$$

with $x_{wet}$ the length, width or thickness of the sample after swelling and $x_{dry}$ the dry length, dry width or dry thickness of the sample.

Two commercially available ion exchange membranes were tested in the same way. The results of the measurements are given in Table 1.

Example 14: Measurement of Mechanical Strength in Deionized Water at Different Temperatures (DMA)

Ion-exchanged membrane samples from Example 10 (3 samples per membrane tested) were stored for 24 in deionized water at 25° C. Before the sample was installed in the measuring system (DMA 8000 with water bath), the width and thickness of each membrane sample were determined. Each measurement was repeated 3 times and a mean±standard deviation was calculated. DMA measurement was performed as follows: —membrane sample is installed between two perpendicular braces with a static preload. In order to apply a static preload to the sample, the distance between the clamps (also referred to as free path length l) is reduced by about 1 mm during installation. The specimen is fixed between the two staples and then the original free path length is restored, stretching the specimen. The entire test setup is immersed in deionized water in a heated water bath so that the sample is completely surrounded by water. The measuring procedure involves the examination of the sample in a temperature range between room temperature (25° C.) and 90° C. at an applied heating rate of 2 K/min. Within this temperature interval, membrane sample is continuously loaded sinusoidally with an elongation ε of 0.1% at a frequency of 1 Hz. The elongation in % results from equation (4):

$$\varepsilon = \Delta l/l \tag{4}$$

with $\Delta l$ of the sample strain in mm and l of the free path. With a free path length of l=10 mm, an elongation of 0.01 mm results for ε=0.1%. Via a force sensor, the voltage required for the given strain is detected.

Two commercially available ion exchange membranes were tested in the same way. The results of the measurement are given in Table 1.

TABLE 1

Experimental data obtained according to Examples 9 to 12 with membranes from Example 4 labeled as Membrane 1, from Example 7 labeled as Membrane 2, from Example 9 labeled as Membrane 3 (all three membranes were ion exchanged in OH-form as described in Example 10) and commercially available membranes.

|  | WU [%] | DS[1] [%] | IC[2] [mS/cm] | IC[3] [mS/cm] | DMA[4] [GPa] |
|---|---|---|---|---|---|
| Membrane 1 | 10.4 ± 1.6 | 4.6 ± 0.4 | 84.1 ± 1.9 | — | 0.661 ± 0.11 |
| Membrane 2 | 6.5 ± 1.9 | 3.9 ± 0.3 | 46.1 ± 1.6 | — | 0.446 ± 0.038 |
| Membrane 3 | 6.9 ± 0.2 | 1.4 ± 0.1 | 11.2 ± 1.2 | — | 0.946 ± 0.092 |
| FAA-3 | 28.4 ± 8.8 | 13.1 ± 2.7 | 30.9 ± 3.4 | — | 0.086 ± 0.01 |
| Nafion N-115 | 14.0 ± 0.7 | 5.1 ± 0.5 | — | 110.7 ± 4.8 | 0.085 ± 0.01 |

FAA-3 is a commercially available anion exchange membrane from FUMATECH BWT GmbH
Nafion N-115 is a commercially available cation exchange membrane from The Chemours Company
[1]These data refer to the change in the thickness of the membrane
[2]These data refer to the conductivity of the membrane measured in OH⁻ form
[3]These data refer to the conductivity of the membrane measured in H⁺ form
[4]All membranes were measured in OH form @ 60° C. (Nafion was measured in H⁺ form)

It can be seen from Table 1, that the membranes according to the invention show a DMA value that is at least 5 times higher than the DMA value of the prior art membranes. It is therefore possible to produce thinner membranes with equal mechanical stability.

The invention claimed is:

1. Compound containing at least one unit of the formula (I)

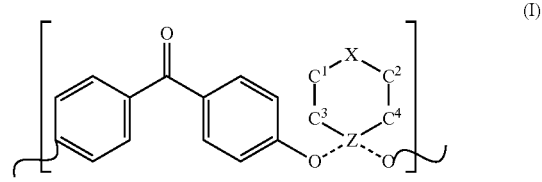

with X being a structure element comprising a nitrogen atom with a positive charge bonded to $C^1$ and $C^2$ and bonded via two bonds to one or two hydrocarbon radical(s) comprising 1 to 12 carbon atoms and Z being a structure element comprising a carbon atom being bonded to $C^3$ and $C^4$ and at least one aromatic 6-ring directly bonded to one of the oxygen atoms, wherein structure element Z represents a unit of formula (IIIa)

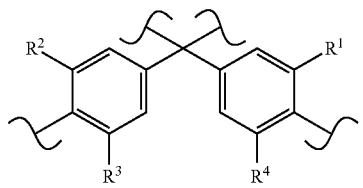

with $R_1$, $R_2$, $R_3$, and $R_4$, being the same or different alkyl group having from 1 to 4 carbon atoms.

2. Compound according to claim 1, characterized in that the compound is represented by formula (Ia) or (Ib)

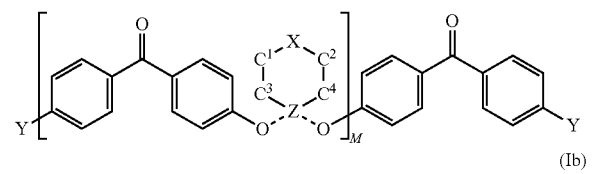

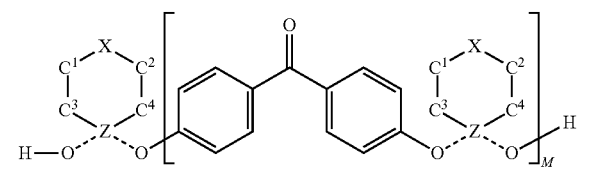

with Y=same or different halogen, M being an integer from 1 to 500, X being a structure element comprising a nitrogen atom with a positive charge bonded to $C^1$ and $C^2$ and bonded via two bonds to one or two hydrocarbon radical(s) comprising 1 to 12 carbon atoms, and Z being a structure element comprising a carbon atom being bonded to $C^3$ and $C^4$ and at least one aromatic 6-ring directly bonded to one of the oxygen atoms.

3. Compound according to claim 1, characterized in that the structure element X represents a unit of formula (IIa) or (IIb)

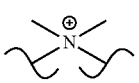

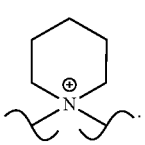

4. Compound according to claim 1, characterized in that the structure element X present represents in more than 50% of its occurrence a unit of formula (IIa) or (IIb).

5. Compound according to claim 1, with $R_1$, $R_2$, $R_3$, and $R_4$ each being a methyl or tert-butyl group.

6. Compound according to claim 1, characterized in that the compound is represented by at least one of formulas (IVa) to (IVd),

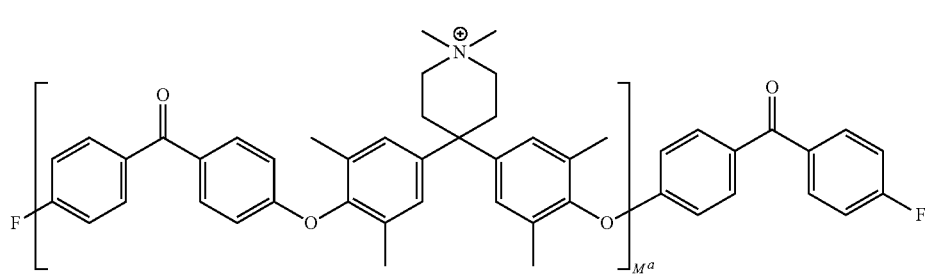

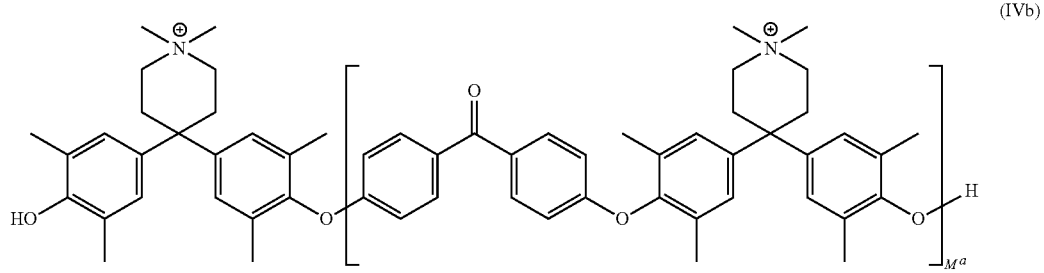

-continued

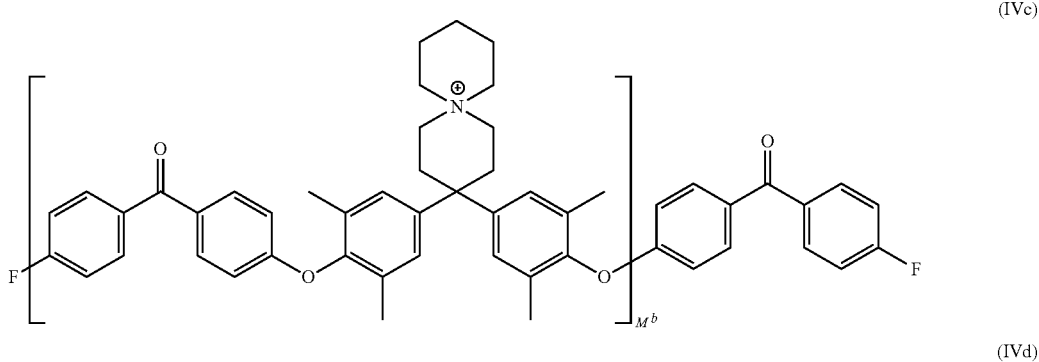
(IVc)

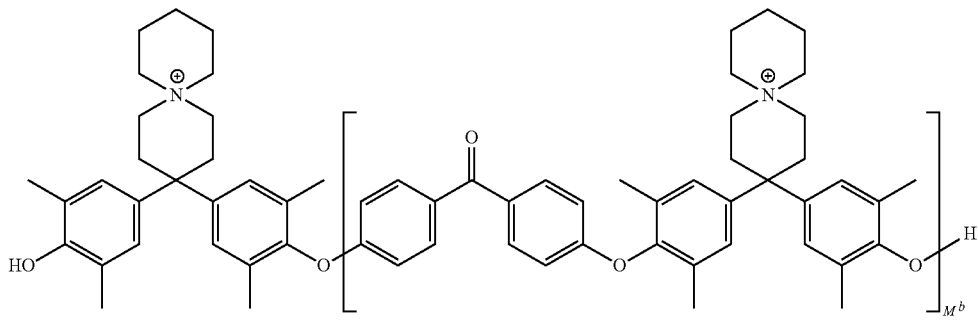
(IVd)

with $M^a$ and $M^b$ being an integer of from 1 to 500.

7. Compound according to claim 2, characterized in that the aromatic rings in the compounds of formula (I), (Ia), and (Ib) are not further substituted with one or more halogen or one or more $C_1$- to $C_4$-alkyl radicals.

8. Process for preparing compounds according to claim 1, characterized in that it comprises a step in which a compound of the formula (V)

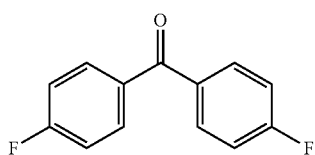
(V)

is reacted with one compound selected from formulas (VIa) to (VIb)

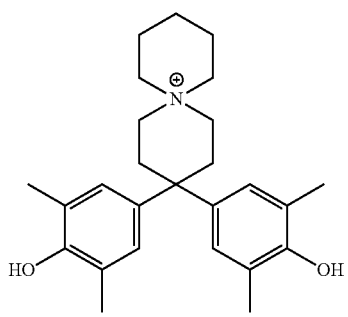
(VIa)

-continued

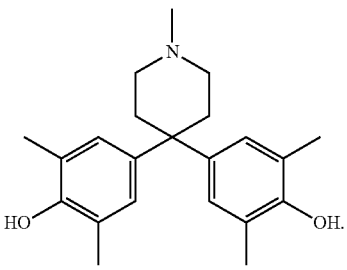
(VIb)

9. Process according to claim 8, characterized in that it comprises a step where an alkylating reagent is used.

10. Process according to claim 8, characterized in that the aromatic rings in the compounds of formula (V), (VIa), and (VIb) are not further substituted with one or more halogen or one or more $C_1$- to $C_4$-alkyl radicals.

11. Electrolyzer, characterized in that it includes a compound according to claim 1.

12. An anion conducting membrane comprising a compound according to claim 1.

13. A method for performing an electrochemical process selected from electrolysis, electrodialysis and fuel cell technology, wherein an anion conducting membrane according to claim 12 is employed.

14. Compound according to claim 6, characterized in that the aromatic rings in the compounds of formula (IVa), (IVb), (IVc), and (IVd) are not further substituted with one or more halogen or one or more C1- to C4-alkyl radicals.

15. Process according to claim 8, characterized in that the process comprises a step where a methylating reagent is used.

* * * * *